Feb. 1, 1927.

P. TOMMEI, JR 1,616,399

VALVE GRINDER

Filed Dec. 21, 1925  2 Sheets-Sheet 1

Paul Tommei, Jr.,
INVENTOR

BY Victor J. Evans
ATTORNEY

Feb. 1, 1927.

P. TOMMEI, JR 1,616,399

VALVE GRINDER

Filed Dec. 21, 1925    2 Sheets-Sheet 2

Patented Feb. 1, 1927.

1,616,399

UNITED STATES PATENT OFFICE.

PAUL TOMMEI, JR., OF NEODESHA, KANSAS.

VALVE GRINDER.

Application filed December 21, 1925. Serial No. 76,849.

This invention relates to improvements in valve grinders for use in connection with internal combustion engines for imparting both a rotary and oscillatory movement to the operating shaft and valve head engaged in order that the valve seat and head may be evenly ground whereby the valves will evenly open and close in order that no escape in the intake nor exhaust of the respective motor will take place.

Another object of my invention residing in the specific construction of a valve grinder per se constituting a housing set to a desired gearing ratio in order that oscillations will be more frequent than the rotations of the shaft in order that a valve head and seat may be evenly ground and such rotations allowing the valve grinding compound to feed to the next surface between the seat and valve head to be ground.

With the above and other objects in view, the invention further includes the following novel features and details of construction, to be hereinafter more fully described, illustrated in the accompanying drawings and pointed out in the appended claims.

In the drawing:—

Figure 1:
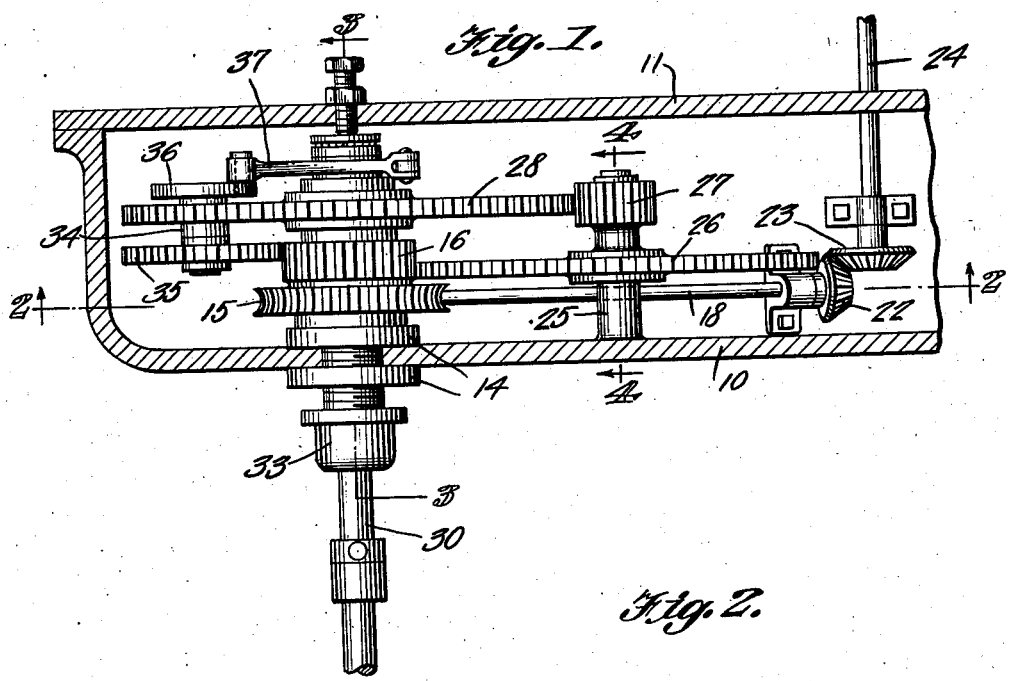
Figure 1 is a top plan view of my invention with the housing broken away and illustrating the arrangement of the elements so forming my invention therein.
Figure 2:
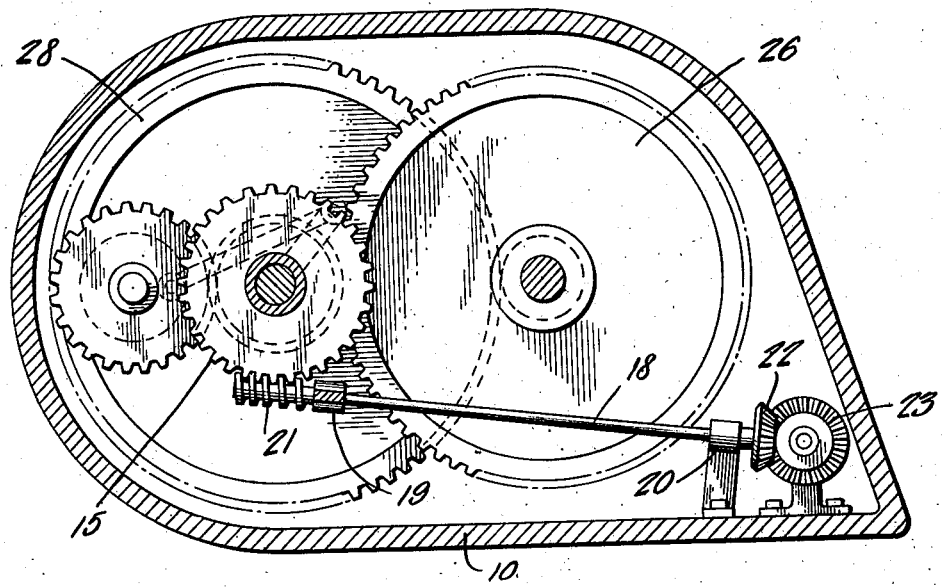
Figure 2 is a longitudinal sectional view taken on line 2—2 of Figure 1.
Figure 3:
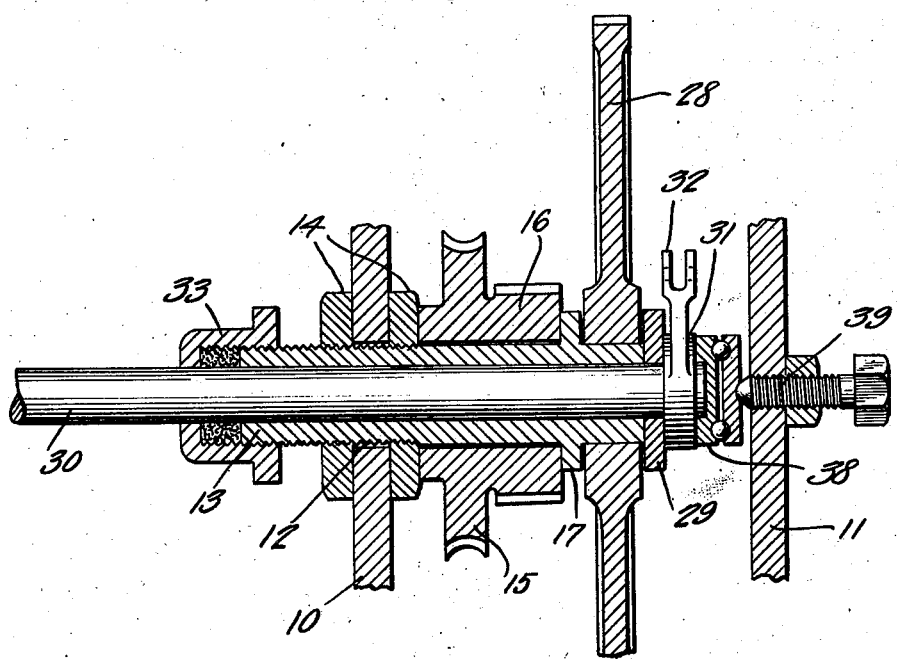
Figure 3 is a sectional view taken on line 3—3 of Figure 1.
Figure 4:
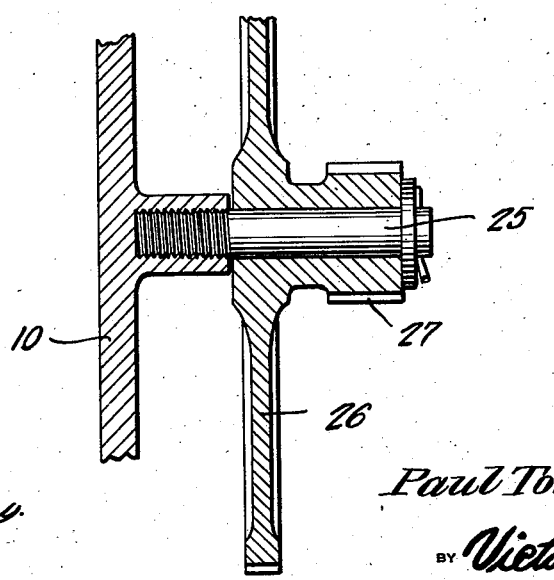
Figure 4 is a similar view taken on line 4—4 of Figure 1.

Referring to the drawings in detail, wherein like characters of reference denote corresponding parts, the reference character 10 indicates a housing and 11 a cover plate therefor. Extending transversely through an opening 12 provided in the housing 10 is an exteriorly threaded sleeve 13 having jam nuts 14 threaded thereon upon the opposite sides of the housing 10 in order that the said sleeve 13 may be rigidly held at an appropriate point in its length upon the said housing 10. A worm gear 15 and integrally formed gear 16 are rotatably mounted upon its sleeve 13 behind the innermost of the jam nuts 14 and an annular flange 17 formed upon the outer surface of the sleeve 13. An operating shaft 18 journaled within bearings 19 and 20 arranged within the housing 10, includes a worm 21 upon one end meshing with the worm gear 15 while its opposite end includes a pinion 22 meshing with the corresponding pinion 23 provided upon one end of a motor shaft 24 in order that a desired momentum and rotation may be imparted to the worm gear 15 and gear 16. Mounted upon a stub shaft 25 positioned within the housing 10 is a relatively large gear 26 meshing with the gear 16 and including a relatively small gear 27 upon its upper side and formed integral therewith. A relatively large gear 28 rotatably mounted upon the sleeve 13 upon the opposite side of the annular flange 17 formed thereon and between a washer 29 meshes with the gear 27. A driving shaft 30 is inserted within the sleeve 13 and washer 29 and includes a collar 31 fixed thereto having a bifurcated arm 32 extending therefrom while a packing gland 33 is provided upon the forward end of the sleeve 13 around the driving shaft 30 for preventing any lubricant from dripping downwardly along the shaft 30 during the operation thereof. Fixed to the lower end of a shaft 34 eccentrically journalled upon the gear 28 is a gear 35 meshing with the gear 16 and having a disk 36 secured to its upper side. A pivoted link 37 is mounted eccentrically upon the upper side of the disk and associated with the outer end of the bifurcated arm 32. A thrust bearing 38 is positioned upon the innermost end of the driving shaft 30 and engaged by a set screw 39 extending through the cover plate 11 of the housing 10 in order that any play of the drive shaft may be taken up incident to excessive wear.

In the mode of operation of the present invention it is clearly apparent and manifest that owing to the foregoing description and accompanying drawings of the various gearing ratios that the relatively large gear 28 may be rotated very slowly through the instrumentality of the gear 27 meshing therewith and in order that the gear 35 meshing with the gear 16 may rotate the disk 36 and impart both a rotary, vibratory and oscillating movement to the driving shaft 30 owing to the association of the bifurcated arm 32 to the disk through the instrumentality of the link 37. In other words the drive shaft 30 will vibrate 184 times per minute while the said shaft slowly moves around at the rate of 16 2/3 R. P. M. This movement allows the valve grinding compound interposed between the valve seat and valve head to be moved around to the next surface to be ground in order that a simultaneous operation of feeding the valve grinding compound and the grinding of new surfaces is afforded.

It is obviously understood that the outer end of the driving shaft 30 may be so constructed as to receive or have integrally formed valve head engaging tools, not shown, in order that such movement and valve grinding action may presently take place.

The invention is susceptible of various changes in its form, proportions and minor details of construction, and the right is herein reserved to make such changes as properly fall within the scope of the appended claims.

Having thus described the invention, what is claimed is:—

1. A valve grinder of the character described comprising a housing having an exteriorly threaded sleeve extending therein, a driving shaft rotatably mounted within the bore of said sleeve, gearing means rotatably mounted upon the sleeve, gearing reduction means associated with the first mentioned gearing means, an operating means associated with the first mentioned gearing means and having its speed controlled by the gearing reduction means, and means operable by the first mentioned gearing means and associated with the driving shaft for imparting an oscillatory movement to the driving shaft during the rotation thereof.

2. A valve grinder of the character described comprising a housing having an exteriorly threaded sleeve extending therein a driving shaft rotatably mounted within the bore of said sleeve, gearing means rotatably mounted upon the sleeve within the housing, gearing reduction means associated with the first mentioned gearing means, an operating means associated with the first mentioned gearing means and having its speed controlled by the gearing reduction means, and means operable by the first mentioned gearing means and associated with the driving shaft for imparting an oscillatory movement to the driving shaft during the rotation thereof, whereby a valve grinding compound may be fed around upon a valve seat and head precedent to the grinding of new surfaces.

3. A valve grinder of the character described comprising a housing having a sleeve extending therein for rotatably mounting the driving shaft within the bore thereof, a worm gear and relatively small gear being integrally formed and rotatably mounted upon the sleeve within the housing, a worm meshing with the worm gear and associated with a source of power for imparting the necessary momentum to such gear, a relatively large gear included within the housing and meshing with the gear upon the worm gear and having a relatvely small gear provided upon its opposite side, a substantially large gear also included upon the sleeve and meshing with the last mentioned gear for reduced gear ratio thereof, a gear suspended upon the under side of the substantially large gear and meshing with the gear included upon the worm gear, and means provided upon the opposite side of the substantially large gear and associated with the suspended gear and the driving shaft for imparting both a rotary and oscillatory movement thereto.

4. A valve grinder of the character described comprising a housing having a sleeve extending therein and rotatably mounting a driving shaft within the bore thereof, a combined worm gear and relatively small gear rotatably mounted upon the sleeve, a substantially large gear is correspondingly mounted upon the sleeve, a worm meshing with the worm gear from a source of power for imparting the necessary momentum thereto, a relatively large gear having a relatively small gear integrally formed therewith, each of which meshing with the relatively small gear on the worm gear and substantially large gear respectively, a stub shaft extending through the substantially large gear and having a gear fixed upon one end meshing with the small gear upon the worm gear, a disk correspondingly mounted upon the opposite end of the stub shaft, a collar fixed upon the innermost end of the driving shaft and having a bifurcated arm extending outwardly therefrom, and a link associated with the bifurcated arm of the collar and having its opposite end pivotally mounted upon the outer side of the disk whereby an oscillatory movement may be imparted to the driving shaft during the rotation thereof.

In testimony whereof I affix my signature.

PAUL TOMMEI, Jr.